March 24, 1959  W. LYONS  2,879,379
VARIABLE ILLUMINATING MIRROR
Filed June 28, 1957  2 Sheets-Sheet 2
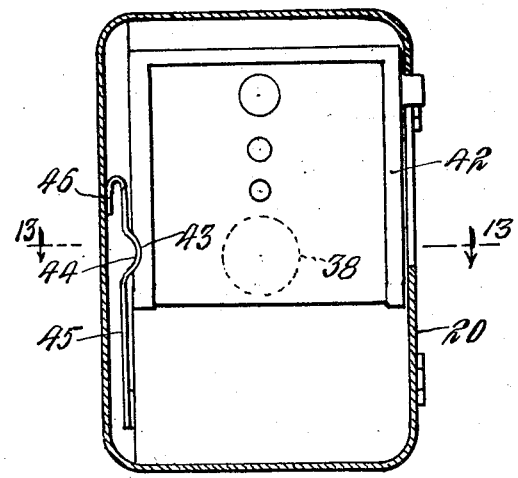
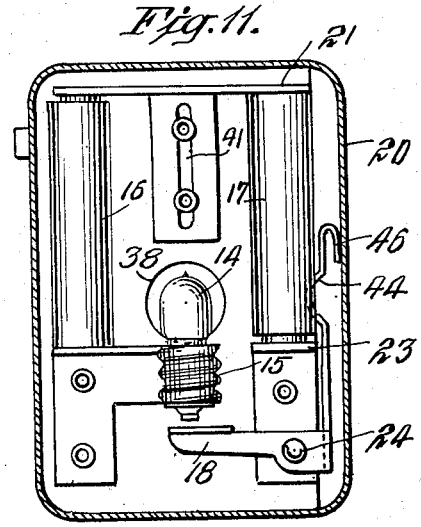
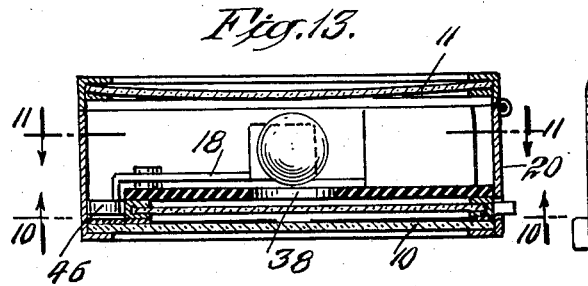
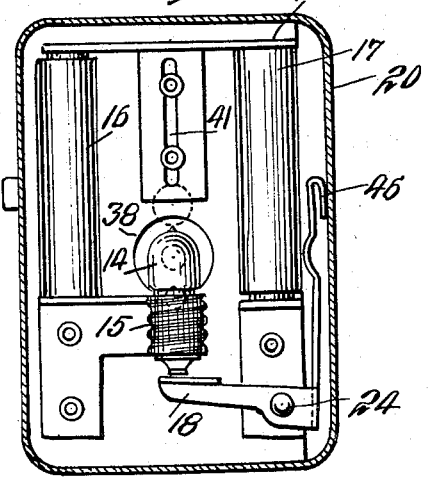
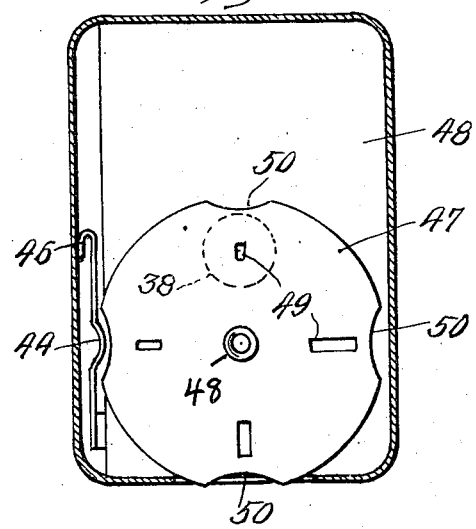
INVENTOR.
WILLIAM LYONS
BY
ATTORNEY United States Patent Office 2,879,379
Patented Mar. 24, 1959

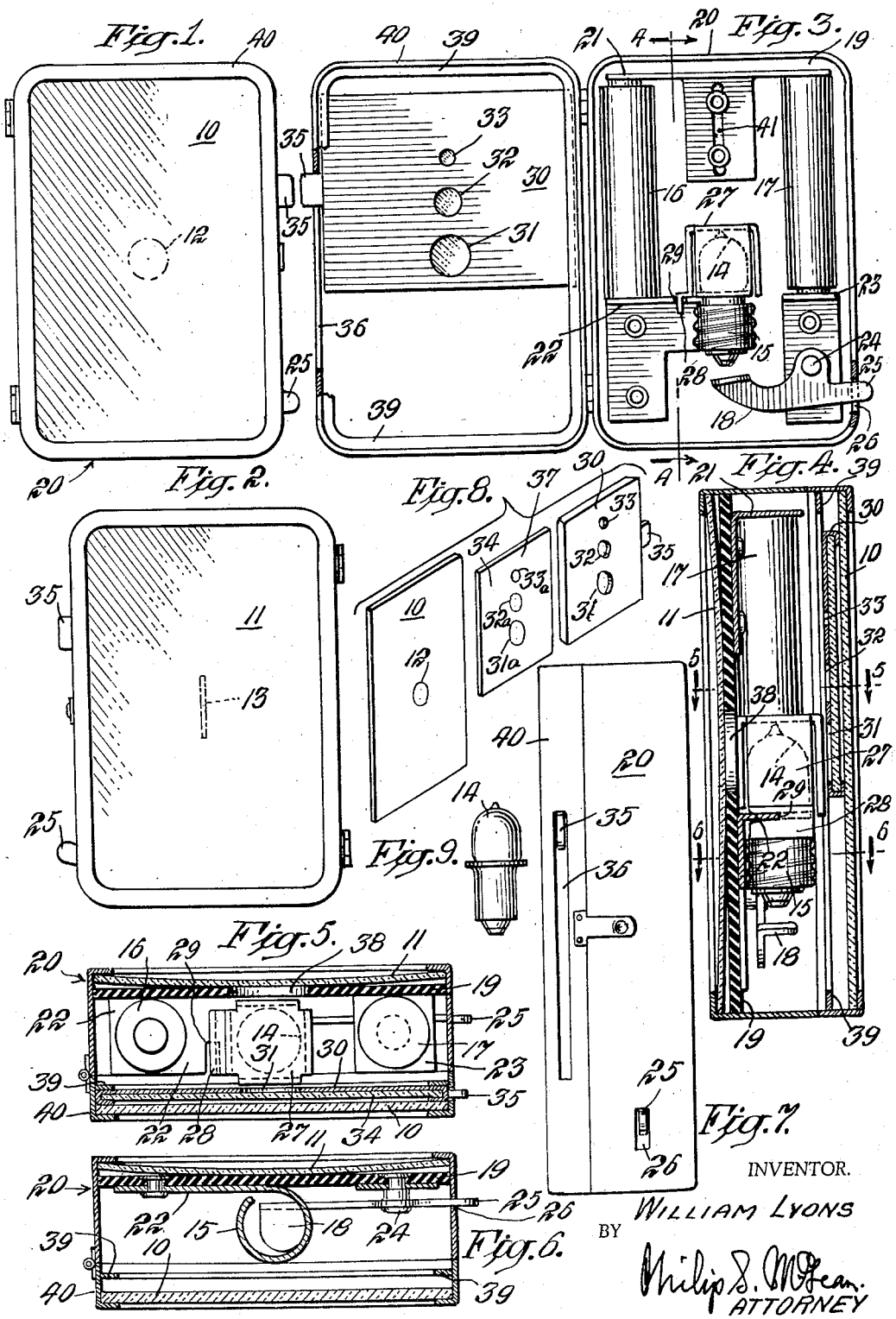

2,879,379
VARIABLE ILLUMINATING MIRROR
William Lyons, New York, N.Y.
Application June 28, 1957, Serial No. 668,813
3 Claims. (Cl. 240—4.2)

The invention herein disclosed relates to mirrors and particular objects of the invention are to provide a practical, desirable mirror by which the face may be illuminated and to the extent best suited for applying cosmetics and the like.

These objects are attained by providing a reflecting mirror with illuminating means in back of the same and by leaving a light passing opening in the mirror through which variable light may be projected to the face or particular features desired to be illuminated.

A special feature of the invention is the provision of a shutter by which the size of the projected light beam may be regulated or in a preferred embodiment, be actually shut off and the mirror be restored to full surface area.

A further special feature is the combining of this adjustable shutter with the switch means for the light, thus providing just one necessary control.

Special objects of the invention are to incorporate and embody all these and other improvement features in a simple, small size, relatively inexpensive packet or carrying case.

Other desirable objects and further novel features and advantages are set forth and will appear in the course of the following specification.

The drawings accompanying and forming part of the specification are illustrative of present preferred embodiments of the invention, but structure and arrangement may be modified and changed, all within the true intent and scope of the invention as hereinafter defined and claimed.

Fig. 1 in the drawings is a front elevation of a form of the invention incorporated in a small hand case, this view showing the mirror having the circular center light aperture.

Fig. 2 is a similar view showing the mirror at the opposite side of the case, having the center, slot like aperture.

Fig. 3 is a plan view showing the case opened up with parts appearing in section.

Fig. 4 is an enlarged sectional view taken on substantially the plane of line 4—4, Fig. 3.

Figs. 5 and 6 are cross-sectional views on substantially the planes of lines 5—5 and 6—6, respectively, Fig. 4.

Fig. 7 is a side or edge view of the case in closed relation, showing the shutter and light switch controls.

Fig. 8 is a perspective view of the apertured mirror and shutter parts.

Fig. 9 is a detail of the miniature lamp used in this illustration.

Figs. 10 and 11 are elevations, partly in section, of the reverse sides of a modified form of the invention, showing the shutter in the position closing the light aperture in the mirror and the light switch in open position taken on substantially the planes of lines 10—10 and 11—11, Fig. 13.

Fig. 12 is a view similar to Fig. 11 with shutter lowered to open up the small light aperture and the switch closed for projection of light through that aperture.

Fig. 13 is a cross-section on substantially the plane of line 13—13 of Fig. 10.

Fig. 14 is a part sectional elevation illustrating a rotary type of shutter form of the invention.

Figs. 1 and 2 show how the invention may be made up as a double mirror with one reflector 10 faced to one side of a light containing case and another reflector 11 faced to the opposite side.

These reflectors may be of different character, the first, for example, a plane mirror and the second a concave, magnifying mirror.

Also, these mirrors may be of different illuminating character, the first having a central, circular light passing aperture 12 and the second having an elongated slit, slot, oval or other such form of light aperture 13.

These light passing openings may be provided by absence of light reflecting material on the backs of the mirrors.

The light source comprises a small electric lamp 14 supported in a spring socket 15 between the two mirrors, arranged to be connected in circuit with the two dry cells 16, 17 by switch lever 18.

These illuminating parts are shown carried by an insulating base plate 19 fitted in the body of the case 20 and carrying one spring contact plate 21 for the ends of the dry cells and other opposite spring contact plates 22, 23 for the other ends of the cells. The latter two contacts are shown as carrying the spring lamp socket 15 and as having the switch lever pivoted thereon at 24. The inner end of this lever is thereby positioned to engage the center contact of the lamp and the outer end is shown projected as an operating handle 25 through slot 26 in the side wall of the case.

The spring socket for holding the lamp is shown in Fig. 6 as formed by a coiled edge portion of the contact strip 22. To prevent pressure of the switch lever forcing the lamp out of position in the socket, a transparent or partly transparent guard 27 is slipped over the end of the lamp and is then turned to engage a slotted hooked lug 28 thereon into locked engagement with a slotted portion 29, Fig. 5 of the contact plate 22.

For controlling the size of the light beam, a shutter is provided in the form of an opaque plate 30, guided to slide in the case in back of mirror 10, having light openings 31, 32, 33, graduated in size and carrying a mirror reflector 34 having corresponding registering light passages 31a, 32a, 33a.

This shutter may be shifted by means of a handle projection 35 extending through slot 36 in the casing to register the three different size light passages with the light opening 12 in the front mirror 10. This shutter is capable of a further slide movement to carry the reflecting surface 37 at the top of shutter mirror 34 in line with light opening 12, thus to complete the full reflecting surface of the front mirror.

The carrying case, with mirrors at both sides, can be made quite small and flat so as to be convenient for carrying in a handbag and for use in more or less public places. The ability to cut down the size of the light beam to suit surroundings and other conditions is of value in enabling an individual to concentrate the light on the face or on particular features of the face, such as lips or eyes, without being observed by others. With the shutter all the way closed, the full surface of the mirror is available. If magnification is desired, the concave mirror 11 may be used and by closing the light switch, illumination be effected through the light slot 13.

Figs. 4 and 5 show the insulating base 19 as having an opening 38 to pass the light from the lamp through the slot light aperture 13 in the concave mirror. These views also show how the shutter is slidingly confined in guideways 39 in the hinged cover portion 40 of the case.

While shown as a small hand or vanity case mirror, it will be appreciated that the invention may be made up as a full size mirror for shaving or other toilet purposes and arranged as a stationary instead of a portable device.

To accommodate batteries of different sizes or adjust to variations in size, the upper spring contact 21, Fig. 3, may be adjustably mounted on the insulating base by means of the slotted construction and securing rivets shown at 41.

The expansible spring socket 15 enables different kinds or different sizes of lamps to be used, for example the plain base type of lamp shown in Fig. 9 or the well known screw base form of lamp.

To better accommodate the latter, the socket forming strip may be corrugated in screw formation as indicated in Fig. 3.

This spring form of socket is desirable also for firmly holding the lamp in place in various positions for locating the filament of the lamp out of direct line with the light apertures.

The cap 27 forming the guard over the lamp may be of plastic or other suitable material.

If desired, a lens may be associated with the lamp for projecting the illumination through the light openings.

The forms of the invention shown in Figs. 10 to 14 are of importance particularly as providing single control for both illumination and the size and shape of the beam.

In the embodiment shown in Figs. 10 to 13, the shutter slide 42 is made with a notch or indentation 43 in one edge to receive the projecting lug 44 on the switch lever 45, and this lever is held in this notch or against the straight edge portion of the slide by the spring end portion 46 of the lever in engagement with the opposing side wall of the case or other abutment.

Fig. 11 shows how in the upper position of the shutter with the reflecting portion 37 of the shutter closing the light aperture and constituting a continuation of the main mirror surface, the switch will be open with the light off and the parts yieldingly held in this relation by spring forced engagement of the switch lug 44 in the notch 43.

Fig. 12 shows how, when the slide is shifted to bring one of the light beam openings in line with the lamp aperture, the switch will be closed and this is true in any of the light beam controlling positions of the shutter.

The form of the invention shown in Fig. 14 differs from that last described particularly in that the shutter is of rotary instead of the sliding type, it being shown as a disc 47 pivoted on the insulating base at 48 having light apertures 49 of different size to register with the lamp aperture, the edge of this disc projecting through the case for engagement by a finger, and said disc having notches 50 for operating the switch lever in generally the same manner as in the sliding type.

What is claimed is:

1. A mirror having a transparent light aperture at the center of the same and a movable shutter in back of said mirror having light apertures of different size positioned to register with the light aperture in the mirror in different positions of the shutter, and having a reflecting surface to register with the light aperture in the mirror in one position of said shutter, a lamp for projecting light through said apertures, a switch for energizing said lamp, and operating connections from said shutter for closing said switch in the positions of said shutter with said light apertures in register with the light aperture in the mirror and for opening said switch when said shutter is positioned with the reflecting surface of the same in register with the light aperture in the mirror.

2. A mirror having a transparent light passage, a lamp positioned in back of said mirror, a casing enclosing said mirror and lamp, an insulating support within said casing in back of said mirror, a contact mounted on said insulating support and provided with a socket for supporting said lamp, a second contact on said insulating support at one side of said first contact, switch means on said second contact positioned for engagement with the lamp supported in said socket, dry cells at opposite sides of said lamp and engaged each at one end with one of said two contacts, a common spring contact in engagement with opposite ends of said dry cells and means adjustably securing said common contact in position on said insulating support enabling adjustment of said common contact toward and away from said first mentioned two contacts for accommodation of different size dry cells or variations in size of the dry cells.

3. An illuminating mirror comprising a case, outwardly faced plane and concave mirrors on opposite sides of said case, spaced apart from each other and provided each with a substantially centrally disposed light passage, the passages in the two mirrors being of different shape, an electric light bulb in the space between said two mirrors and arranged to direct the light therefrom through said differently shaped light passages in said mirrors, dry cells within said case in the space between said mirrors and disposed at opposite sides of said electric lamp and electrical connections between said dry cells and light bulb including a switch member having an operating handle exposed to the outside of the case.

References Cited in the file of this patent
UNITED STATES PATENTS

| | | |
|---|---|---|
| 1,321,026 | Freed | Nov. 14, 1919 |
| 1,364,278 | Hochsteter | Jan. 4, 1921 |
| 2,200,114 | Konikoff | May 7, 1940 |
| 2,440,938 | Falge | May 4, 1948 |
| 2,580,258 | Tarasuk | Dec. 25, 1951 |

FOREIGN PATENTS

| | | |
|---|---|---|
| 422,799 | Great Britain | Jan. 18, 1935 |
| 480,194 | Great Britain | Feb. 18, 1938 |
| 754,586 | Germany | July 8, 1949 |